July 19, 1955 G. HILL 2,713,234
APPARATUS FOR SCARFING THE ENDS OF METAL STRIPS
Filed Dec. 15, 1951 5 Sheets-Sheet 1

INVENTOR
Gordon Hill
BY Evans & McCoy
ATTORNEYS

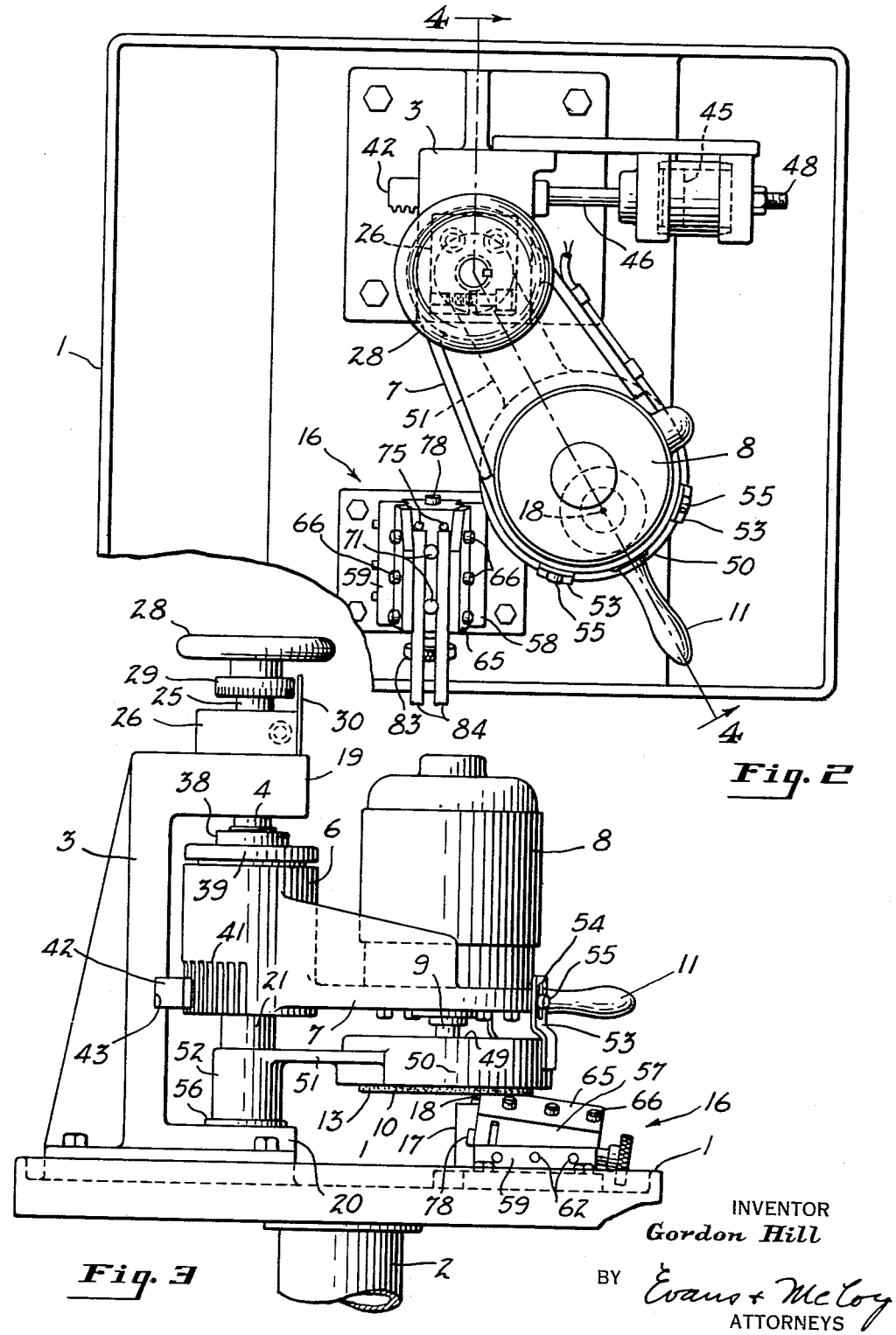

July 19, 1955  G. HILL  2,713,234
APPARATUS FOR SCARFING THE ENDS OF METAL STRIPS
Filed Dec. 15, 1951  5 Sheets-Sheet 3

INVENTOR
*Gordon Hill*
BY *Evans + McCoy*
ATTORNEYS

July 19, 1955  G. HILL  2,713,234
APPARATUS FOR SCARFING THE ENDS OF METAL STRIPS
Filed Dec. 15, 1951  5 Sheets-Sheet 4

INVENTOR
Gordon Hill
BY Evans & McCoy
ATTORNEYS

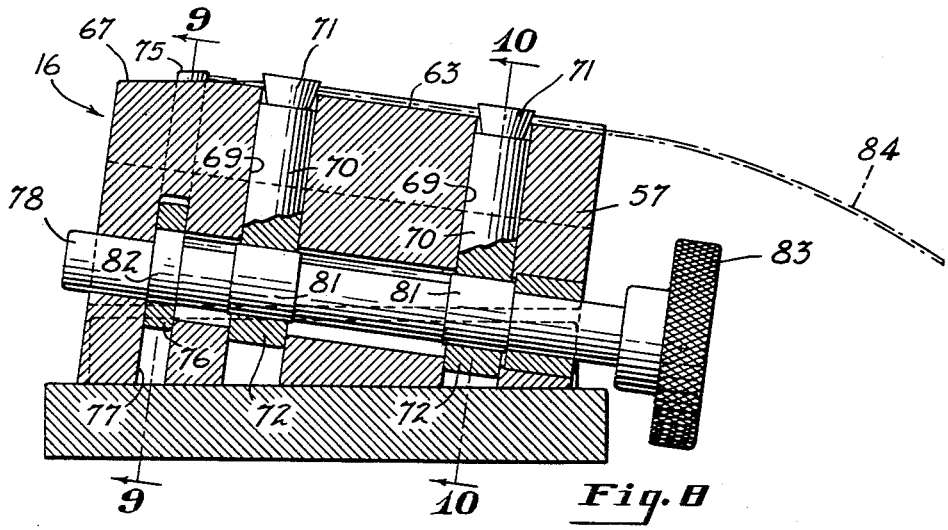
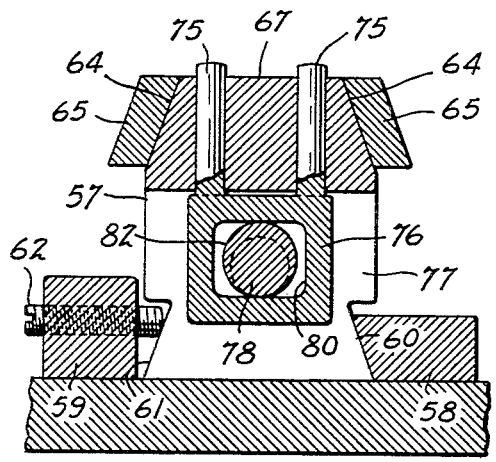
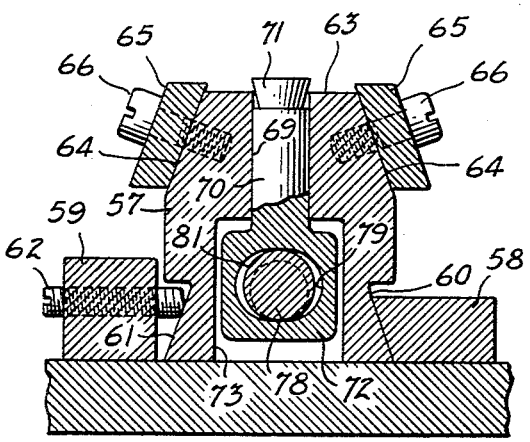
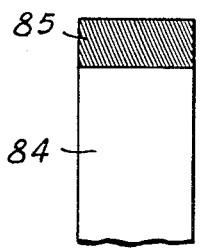
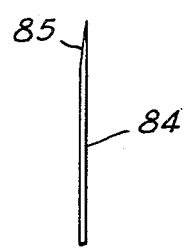

United States Patent Office 2,713,234
Patented July 19, 1955

2,713,234

APPARATUS FOR SCARFING THE ENDS OF METAL STRIPS

Gordon Hill, Davenport, Iowa, assignor, by mesne assignments, to Bettendorf Bakery Equipment Company, Bettendorf, Iowa, a corporation of Iowa Application December 15, 1951, Serial No. 261,891

7 Claims. (Cl. 51—55)

This invention relates to an apparatus for scarfing the ends of metal strips preparatory to joining said ends, and particularly to an apparatus for scarfing the opposite ends of an elongated, flexible metal strip simultaneously to form identical scarfs on the opposite ends of the strip preparatory to joining the ends together to form an endless metal band such as the metal bands used in bread slicing machines.

In the machine of the present invention the two strip ends to be joined are clamped side by side on a flat bed with their end edges alined with an end edge of the bed and the two strip ends so clamped are simultaneously scarfed by passing the peripheral edge of a flat faced grinding wheel over the bed and across the ends of the strip at a small inclination to the bed, the grinding wheel being positioned with its flat face intersecting the plane of the bed along the end edge with which the strip ends are alined so that the strip ends acted upon by the grinding wheel are rigidly supported during the grinding operation.

In scarfing the opposite ends of an elongated strip preparatory to joining the ends of the strip to form an endless band the strip is twisted intermediate its end through 180° and the strip ends are clamped to the supporting bed with reverse faces in engagement with the bed so that the two ends are identically scarfed and so that the scarfs will face oppositely when the ends are brought together for joining.

The invention has for an object to provide a machine by which identical scarfs can be simultaneously and rapidly cut in the metal strip ends to be joined.

Further objects are to provide means for securely holding the strips on a supporting bed in such position thereon that their ends are rigidly supported and exposed to a scarfing tool overlying the bed and movable in a plane at an inclination to the bed, and to provide a grinding wheel so disposed with respect to the clamped strip ends that the said ends can be scarfed during a single pass of a grinding wheel over the said ends.

A further object is to provide means for securely clamping the strip ends to a supporting bed by means of clamping elements that are positioned entirely below the plane of the scarf.

Referring to the accompanying drawings:

Fig. 2 is a top plan view of the machine;

Fig. 3 is a fragmentary side elevation of the grinding wheel and work support;

Fig. 8 is a vertical section taken on the line indicated at 8—8 in Fig. 7;

Fig. 9 is a section taken on the line indicated at 9—9 in Fig. 8;

Fig. 10 is a section taken on the line indicated at 10—10 in Fig. 8;

Fig. 11 is a top plan view showing a scarfed end of a metal strip; and

Fig. 12 is a side elevation of the scarfed end shown in Fig. 11.

Figure 1:
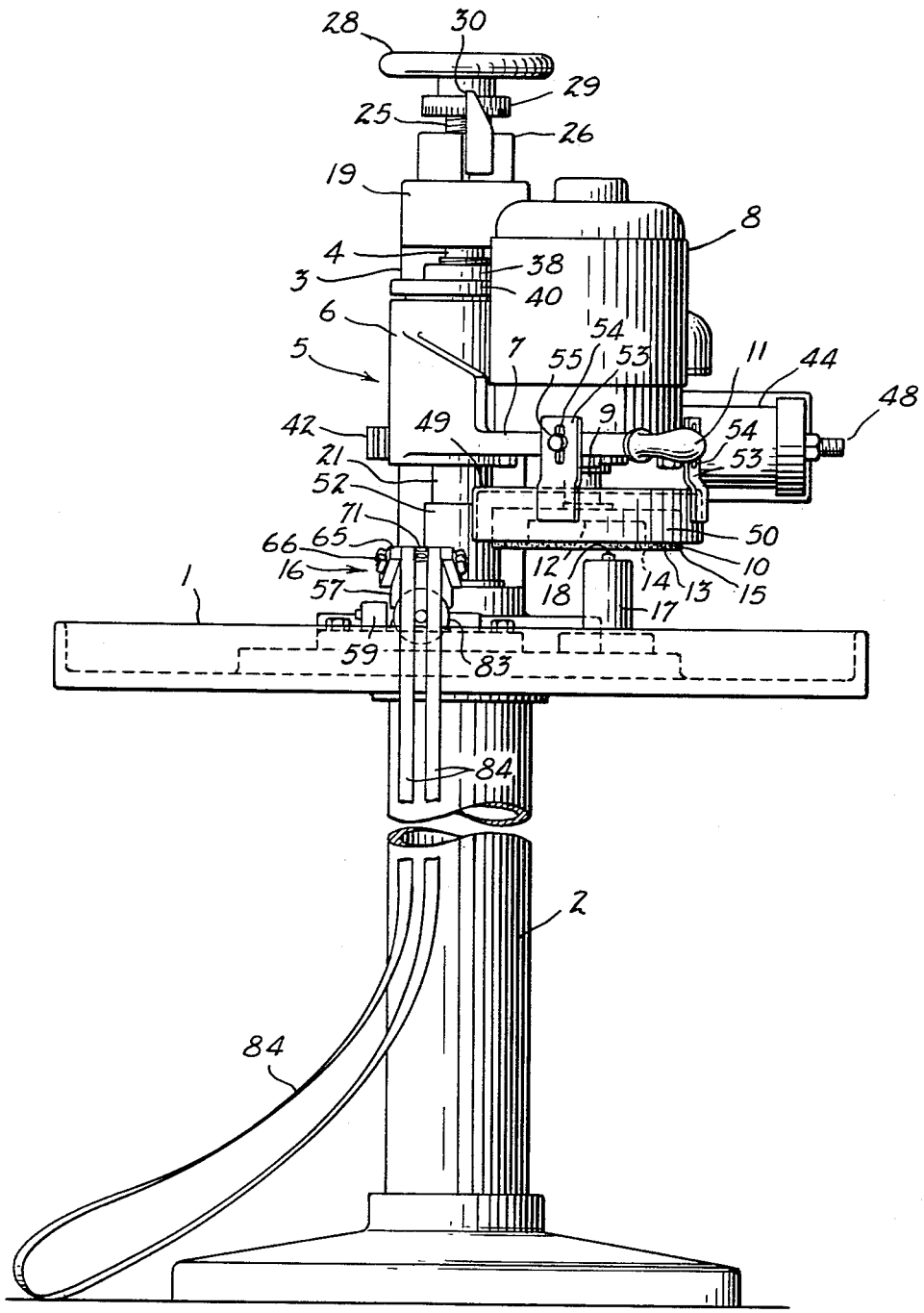
Figure 1 is a front elevation of the scarfing machine embodying the invention.

As shown in Fig. 1 of the drawings, the scarfing device of the present invention is mounted upon a table 1 that is supported on a pedestal 2. The table 1 has a supporting bracket 3 mounted thereon in which a vertical pivot post 4 is mounted. On the post 4 there is mounted a swinging carrier 5 which has a bearing sleeve 6 rotatably mounted on the post. A radial arm 7 is formed integrally with the sleeve 6 that provides a support for an electric motor 8. The electric motor 8 has a vertical shaft 9 that extends downwardly through the arm 7 and to the lower end of the shaft 9 there is attached a grinding wheel 10. The scarfs are cut on the ends of the metal strip by means of the grinding wheel 10 which is movable over the work support when the supporting arm 7 is swung laterally. To enable the grinding wheel to be moved manually across the strip ends during the scarfing operation, the arm 7 is provided with a handgrip 11 at its outer end. The grinding wheel 10 has a central recess 12 on its under face and outwardly of the recess 12 has a flat annular bottom face 13 that extends from an inner peripheral edge 14 that extends around the recess 12 to an outer peripheral edge 15 at the outer periphery of the grinding wheel.

A work support 16 is attached to the table 1 and is positioned below the grinding wheel 10 so that the grinding wheel can be moved over the work support to grind the strip ends clamped to the support. Alongside the work support there is mounted a dresser support 17 which has a diamond 18 mounted in the top thereof for engagement with the bottom face 13 of the grinding wheel.

The supporting bracket 3 is provided with top and bottom flanges 19 and 20 which provide spaced supports for the pivot post 4. The post 4 has a lower end portion 21, an intermediate portion 22 and an upper end portion 23, the intermediate portion 22 being of less diameter than the lower portion 21 and the upper portion 23 being of less diameter than the intermediate portion 22.

The swinging carrier 5 is journalled on the intermediate portion 22 and the lower portion 21 and upper portion 23 are slidably mounted in the flanges 20 and 19 respectively. The flanges 19 and 20 are bored to receive the portions 23 and 21 of the post and the post is vertically adjustable to raise or lower the grinding wheel. For adjustment the upper portion 23 of the post has a threaded portion 25 which has threaded engagement with a nut 26 detachably secured to the flange 19, the flange 19 being provided with a counterbore 27 to accommodate a portion of the screw thread 25 below the nut 26. The upper end of the post 4 has a handwheel 28 attached thereto by means of which the post may be turned to move it up or down. A graduated collar 29 is attached to the hub of the handwheel 28 and a pointer 30 attached to the nut 26 overlies the graduated scale on the periphery of the collar 29 so that the extent of angular adjustment of the post 4 can be accurately determined to measure minute vertical adjustments of the grinding wheel 10.

Figure 4:
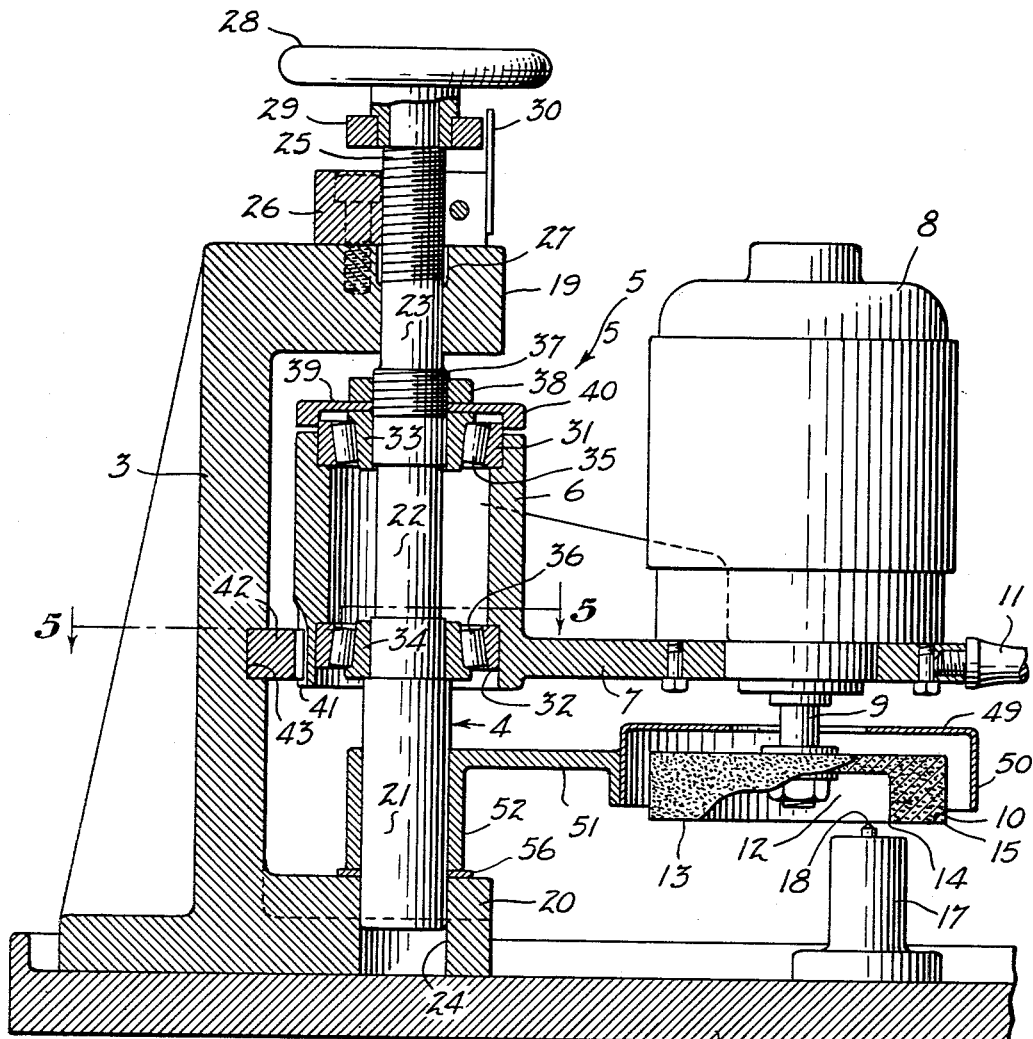
Fig. 4 is a fragmentary vertical section taken on the line indicated at 4—4 in Fig. 2.
Figure 5:
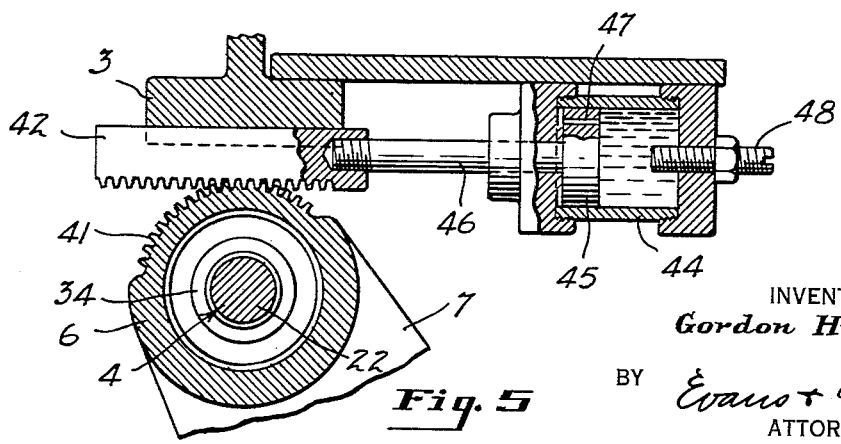
Fig. 5 is a horizontal section taken on the line indicated at 5—5 in Fig. 4.
Figure 6:
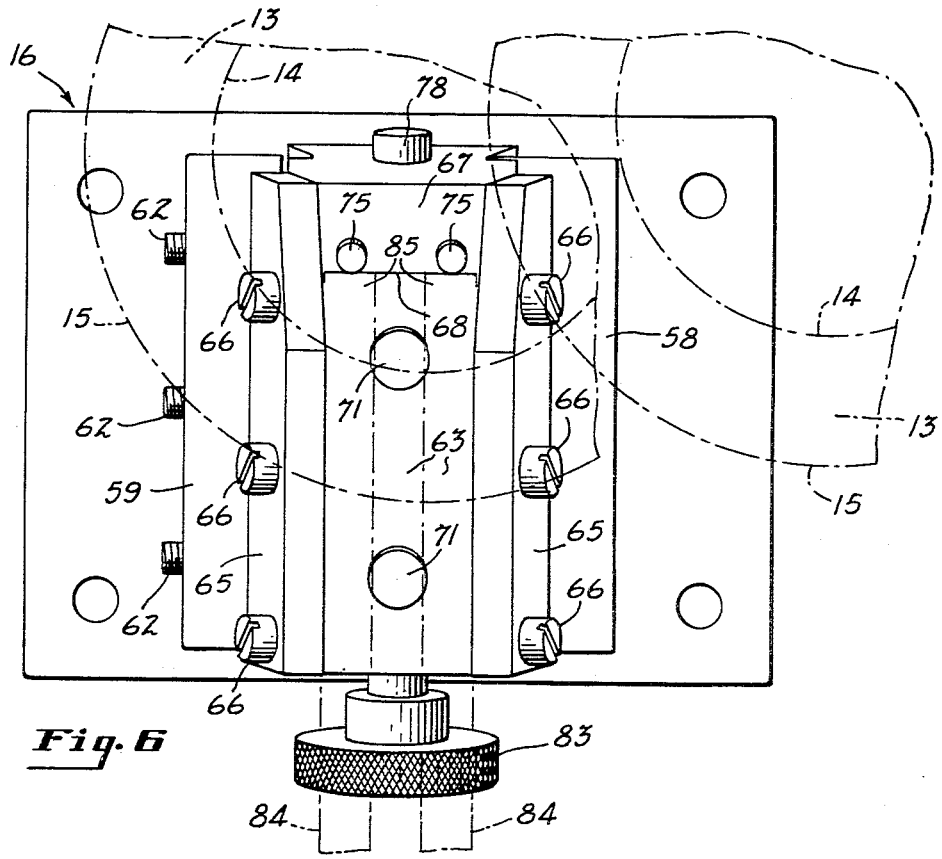
Fig. 6 is a top plan view of the work support.
Figure 7:
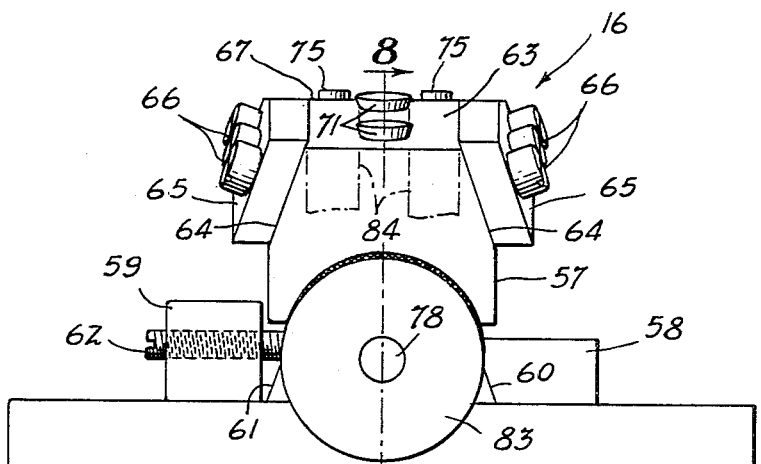
Fig. 7 is a front elevation of the work support.

As best shown in Fig. 4, the carriage 5 is supported on roller thrust bearings at the upper and lower ends of the sleeve portions 6. Upper and lower race rings 31 and 32 are mounted in counterbores formed in the upper and lower ends of the sleeves 6 and upper and lower inner race rings 33 and 34 are mounted on the post 4. Upper and lower sets of rollers 35 and 36 are mounted between the race rings 31 and 33 and 32 and 34 respectively. The upper rollers 35 are mounted with their axes converging downwardly and the rollers 36 are mounted with their axes converging upwardly, the interior faces of the race rings 31 and 32 being oppositely tapered and the inner race rings 33 and 34 having tapering external faces that parallel the inner faces of the rings 31 and 32. The lower race ring 34 rests upon a shoulder at the upper end of the enlarged lower portion 21 of the post and the upper inner race rings 33 are slidable on the post. The upper end of the intermediate portion 22 of the post 4 has a threaded portion 37 which receives a nut 38 that exerts a downward thrust on the inner race ring 33 to secure the sleeve 6 against vertical movement on the post. A dust guard 39 is clamped between the nut 38 and the race ring 33 and has a cylindrical flange 40 that slidably fits over the upper end of the race ring 31.

A gear segment 41 is formed on the lower end of the sleeve 6 and this gear segment meshes with a horizontally disposed rack 42 that is slidably mounted in a horizontal groove in the bracket 3 so that an endwise movement is imparted to the rack 42 when the carrier 5 is swung laterally on the post 4. The movement of the rack 42 is retarded to prevent movement of the grinding wheel 8 at too rapid a rate over the work. For retarding the rack 42 a dash pot cylinder 44 is mounted in horizontal alinement with the rack 42 and has a piston 45 with a rod 46 which is attached to the rack 42. The cylinder 44 is filled with oil and the piston 45 is provided with a passage 47 of small diameter through which oil must flow in one direction or the other during movement of the piston in the cylinder. The passage 47 permits a flow of oil which is substantially proportional to the pressure applied to the piston 45 and prevents rapid lateral movement of the grinding wheel 10 by manual pressure applied to the handle 11. The cylinder 44 carries an adjustable stop screw 48 which serves to limit the extent of angular movement of the arm 7 and which can be adjusted to increase or decrease the movement of the arm.

A guard 49 is provided for the grinding wheel 10, the guard 49 having a depending cylindrical flange 50 which surrounds the periphery of the grinding wheel 10. The guard 49 is supported at a fixed elevation on a radial arm 51 that is formed integrally with a collar 52 that is rotatably mounted on the lower portion 21 of the post 4. The guard 49 is constrained to move laterally with the grinding wheel by means of plates 53 attached at their lower ends to the guard 49 and having vertical slots 54 which receive bolts 55 secured to the arm 7. The plates 53 constrain the arm 51 and guard 49 to laterally swinging movement with the arm 7 but permit vertical adjustment of the arm 7 and grinding wheel 10 with respect to the dust guard 49. The collar 52 rests on the bottom flange 20 of the supporting bracket so that vertical adjustment of the post 4 does not change the vertical position of the guard 49. The guard 49 may be adjusted vertically if desired by means of shims 56 interposed between the collar 52 and the flange 20.

The work support 16 is detachably and adjustably mounted on the table 1 and comprises a block 57 that is adjustably mounted between parallel guide members 58 and 59 secured to the table 1. The lower portion of the block 57 is recessed to provide upwardly tapering inclined side faces 60 and 61. The inclined face 60 fits against a correspondingly inclined inner face of the guide member 58 and the oppositely inclined face 61 is engaged by horizontally disposed clamping screws 62 mounted in the guide member 59. When the clamping screws 62 are loosened the block 57 can be adjusted longitudinally between the guide members 58 and 59 and by tightening the screws 62 the block can be clamped in adjusted position.

The block 57 is provided with a longitudinal top face 63 that is inclined at a small angle to the horizontal, the top face 63 of the block forming a strip supporting bed which is inclined upwardly toward the post 4. Adjacent the top thereof the block 57 has inclined side face portions 64 upon which longitudinal guide members 65 are mounted. The top edges of the guide members 65 are parallel to the supporting bed 63 and project a short distance above the bed 63, the guide members 65 being rigidly secured to the block 57 by means of bolts 66. The top of the block 57 has a horizontal rear end portion 67 the plane of which intersects the plane of the inclined bed 63 on a transverse horizontal line 68 at the upper end of the bed 63.

As shown in Fig. 8, the block 57 has longitudinally spaced centrally disposed bores 69 that are disposed perpendicular to the bed 63 and these bores receive vertically slidable pins 70 each of which is provided at its upper end with a frustoconical head 71 that is formed by grooving the exterior of the pin. The pins 70 have enlarged lower ends 72 that are positioned in recesses 73 in the block 57. Adjacent the rear end of the block 57 a pair of stop pins 75 are provided which are slidable in bores that are parallel to the bores 69 and that open to the horizontal face 67 tangent to the line 68 so that the peripheries of the pins 75 provide stops for positioning the strip ends on the transverse line 68. The pins 75 are integral with a head 76 that is mounted in a recess 77 in the block 57.

A shaft 78 journaled in the block 57 extends parallel to the bed 63 and passes through openings 79 in the lower portions 72 of the pins 70 and through on opening 80 in the head 76. Cams 81 on the shaft 78 positioned within the openings 79 serve to simultaneously raise and lower the pins 70 as the shaft 78 is turned. A cam 82 positioned in the opening 80 in the head 76 serves to raise and lower the pins 75 when the shaft 78 is turned. A handwheel 83 is provided at the forward end of the shaft 78 by means of which the shaft 78 may be turned to raise and lower the pins 70 and 75.

The strip bands to be scarfed are placed on the bed 63 between the heads 71 of the pins 70 and the side guide members 65 with the pins 70 and 75 in their uppermost positions. The strip ends are engaged with the stop pins 75 and the shaft 78 is turned by means of the handwheel 83 to simultaneously lower the pins 70 and 75. The downwardly tapering heads 71 engage with the inner edges of the strip ends and crowd the strips laterally against the guide members 65 so that when the heads 71 are in their lowermost positions the strips are securely clamped to the bed 63. At the same time the pins 75 are lowered sufficiently to bring their upper ends below the plane of the horizontal surface 67. When the clamping pins 70 and stop pins 75 are in their lowermost positions, the heads 71 as well as the upper ends of the pins 75 are below the plane of the horizontal face 67. The upper edges of the guide members 65 at their inner ends are also in the horizontal plane of the face 67 so that the grinding wheel 10 can be moved across the face 67 in very close proximity thereto.

With the strip ends clamped on the bed 63, as above described, movement of the grinding wheel across the horizontal face 67 of the support causes a peripheral edge of the grinding wheel to move across the ends of the clamped strips substantially in the plane of the face 67 to scarf the strip ends in one pass of the grinding wheel, the strip ends 84 having a scarf 85 cut therein which lies in the horizontal plane of the face 67 when the strip is clamped to the work support.

The horizontal top face 67 at the inner end of the work support may be formed if desired by means of the grinding wheel 10 and may be resurfaced at any time by means of the grinding wheel 10. The dashpot 44 insures a steady movement of the grinding wheel across the ends of the strips being ground, thereby preventing excess wear on the grinding wheel and enabling a deep cut to be taken by the grinding wheel so that a single pass is sufficient to scarf the ends of the metal strip.

The diamond 18 is set with its point in the plane of the horizontal face 67 of the work support and the grinding wheel is dressed by imparting a downward movement to the post 4 by turning the handwheel 28. Since the grinding wheel sweeps across the dressing point each time the grinding wheel is swung back and forth across the work, the diamond 18 will true the bottom face 13 of the wheel to the plane of the horizontal face 67 of the work support.

It is to be understood that in accordance with the provisions of the patent statutes, variations and modifications of the specific devices herein shown and described may be made without departing from the spirit of the invention.

What I claim is:

1. A machine for scarfing the ends of flat metal strips comprising a work support having a flat inclined bed having a horizontal upper edge, guides disposed in parallel relation and spaced laterally to receive metal strip ends between them, means for clamping said strip ends to said bed and for pressing said ends toward said guides to hold the same in parallel relation on said bed with the bed engaging bottom faces of said ends extending to said edge, a grinding wheel having a peripheral edge and a flat face perpendicular to its axis and bordering said peripheral edge, means for driving said grinding wheel, and means for supporting said wheel with the plane of its flat face above and close to the plane of said upper edge of the bed and for movement horizontally to pass said peripheral edge across strip ends clamped to said bed to scarf the same.

2. A machine for scarfing the ends of flat metal strips comprising a work support having a flat inclined bed having a horizontal upper edge, a pair of parallel guides spaced laterally to receive metal strip ends between them, means intermediate said guides for clamping said strip ends to said bed and against said guides side by side and in parallel relation with the bed engaging bottom faces of said ends extending to said edge, a support mounted for horizontal movement above said bed, a grinding wheel journaled in said support to rotate about a vertical axis, said grinding wheel having a peripheral edge and a flat bottom face bordering said edge, means for driving said grinding wheel and means for adjusting the grinding wheel vertically to position said peripheral edge and bottom face with respect to said bed.

3. A machine for scarfing the ends of flat metal strips comprising a work support having an inclined flat bed having a horizontal edge at its upper end, guide members associated with said bed for positioning two strip ends in parallel relation on the bed, a retractable stop member for engagement with the end edges of the strip ends to position the said end edges substantially at said end edge, movable means for clamping said strip ends to said bed, means for simultaneously actuating said stop member and said clamping means to retract the stop member and clamp the strip ends to the bed, a grinding wheel having a peripheral edge and a flat face perpendicular to its axis bordering said edge, means for driving said grinding wheel, and means for supporting said wheel with its flat face horizontal and substantially in the plane of said horizontal edge of the bed and for movement in a direction perpendicular to its axis whereby said peripheral edge may be passed across the strip ends to scarf the same.

4. A machine for scarfing the ends of flat metal strips comprising a work support having an inclined flat bed having a horizontal edge at its upper end, guide members associated with said bed for positioning two strip ends in parallel relation on the bed, a retractable stop member for engagement with the end edges of the strip ends to position the said end edges substantially at said end edge, movable means for clamping said strip ends to said bed, means for simultaneously actuating said stop member and said clamping means to retract the stop member and clamp the strip ends to the bed, a support mounted above the bed for horizontal movement substantially in the direction of said horizontal edge, a grinding wheel carried by said support and mounted to rotate about a horizontal axis, said grinding wheel having a peripheral edge and a horizontal bottom face bordering said edge, means for adjusting said grinding wheel vertically, and means for driving said grinding wheel.

5. A machine for scarfing the ends of flat metal strips comprising a work support having an inclined strip supporting bed that has a horizontal edge at its upper end, means below said edge for clamping a strip to said bed with an end thereof overlying said edge, a bracket adjacent said work support, an arm, a vertical post mounted for endwise sliding movement in said bracket, an arm mounted for horizontal swinging movement on said post, a vertical shaft journaled in said arm, a grinding wheel attached to the lower end of said shaft and having a flat bottom face movable across the upper end of said bed upon a swinging movement of said arm, means for driving said grinding wheel, means for adjusting said post vertically to position said grinding face with respect to said bed, a hand grip on said arm for swing the same manually, a gear segment attached to said arm, a horizontal rack slidably mounted in said bracket and meshing with said segment, a dash pot connected to said rack bar to retard movement thereof in either direction, said dash pot including a liquid containing cylinder, a piston in said cylinder having a restricted opening for passage of liquid and connected to said rack bar, and an adjustable stop for limiting the movement of said piston and for varying the extent of angular movement of said arm.

6. In a machine for scarfing the ends of flat metal strips, a work support having a flat inclined bed that has a horizontal edge at its upper end, side guide members projecting above said bed, clamping members movably mounted in said support and projecting through said bed midway between said side guide members, said clamping members having downwardly tapering strip engaging portions above said bed for pressing said strips against said side guide members, a stop member carried by said work support for positioning the strip ends, said stop member being movable from a position projecting above said horizontal edge to a retracted position below the bed, and means for moving said clamping members downwardly to strip gripping position and for simultaneously moving said stop member to said retracted position.

7. In a machine for scarfing the ends of flat metal strips, a work support having a flat inclined bed that has a horizontal edge at its upper end, side guide members projecting above said bed, clamping pins spaced longitudinally of said bed and midway between said side guide members, said pins being mounted for endwise movement in said support and being perpendicular to said bed, each of said pins having downwardly tapering upper end portions engageable with strips on the bed to press the same against said guide members, laterally spaced stop pins parallel with said clamping pins and positioned with their longitudinal strip engaging edges intersecting said horizontal end edge of the bed, a shaft journaled in said support below the bed and cams on said shaft for simultaneously moving said clamping pins to clamping position and said stop pins to positions below the plane of said bed.

(References on following page)

References Cited in the file of this patent

UNITED STATES PATENTS

| | | |
|---|---|---|
| 133,711 | Mason | Dec. 10, 1872 |
| 1,337,352 | Gardner | Apr. 20, 1920 |
| 1,867,623 | Gouldbourn et al. | July 19, 1932 |
| 1,927,104 | Thompson | Sept. 19, 1933 |
| 2,028,315 | Bruhl et al. | Jan. 21, 1936 |
| 2,082,020 | Moon | June 1, 1937 |
| 2,392,780 | Shugars | Jan. 8, 1946 |
| 2,419,457 | Mahlmeister | Apr. 22, 1947 |
| 2,553,528 | D'Avaucourt | May 15, 1951 |

FOREIGN PATENTS

| | | |
|---|---|---|
| 649,748 | France | Sept. 4, 1928 |
| 536,957 | Germany | Oct. 29, 1931 |
| 414,940 | Italy | Sept. 5, 1946 |
| 425,639 | Italy | Oct. 10, 1947 |
| 978,787 | France | Nov. 29, 1950 |